United States Patent [19]

Parkhurst et al.

[11] 4,389,649
[45] Jun. 21, 1983

[54] DUAL CHANNEL CORRELATOR FOR AN FM-CW RANGING RADAR

[75] Inventors: Ross A. Parkhurst, Bethesda; David L. Rodkey, Kensington; John O. Wedel, Ellicott City, all of Md.

[73] Assignee: The United States Army as represented by the Secretary of the Army, Washington, D.C.

[21] Appl. No.: 196,409

[22] Filed: Oct. 14, 1980

[51] Int. Cl.³ .............................................. G01S 13/02
[52] U.S. Cl. .................................. 343/17.5; 343/5 HM
[58] Field of Search ............. 343/5 HM, 17.5, 100 LE

[56] References Cited

U.S. PATENT DOCUMENTS

| | | | |
|---|---|---|---|
| 2,931,030 | 3/1960 | Rey | 343/17.5 X |
| 3,079,557 | 2/1963 | Crabtree | 343/5 HM X |
| 3,444,509 | 5/1969 | Rubega et al. | 343/5 HM X |
| 3,719,946 | 3/1973 | Sletten et al. | 343/17.5 X |
| 3,725,917 | 4/1973 | Sletten et al. | 343/17.5 X |
| 3,798,642 | 3/1974 | Augenblick et al. | 343/5 HM X |
| 4,313,216 | 1/1982 | Jaeger et al. | 343/5 HM X |

Primary Examiner—Malcolm F. Hubler
Attorney, Agent, or Firm—Nathan Edelberg; Robert P. Gibson; Saul Elbaum

[57] ABSTRACT

A method and apparatus for eliminating the sidelobe ambiguity in the range response of an FM-CW radar. An FM-CW signal with a periodic modulation frequency is transmitted and reflected from a target, received and combined with a sample of the transmitted signal to provide a combination signal. A portion of this combination signal including a selected harmonic and next adjacent harmonic is amplified and mixed with reference signals comprising the selected harmonic and next adjacent harmonic to provide two separate difference signals. These signals are in turn low pass filtered and further mixed to provide a range response with a mainlobe of one polarity and all side lobes of an opposite polarity. The energy under the mainlobe is detected and integrated to provide a voltage signal. When this voltage signal reaches a preset threshold level a further signal is generated.

16 Claims, 19 Drawing Figures

HYPOTHETICAL OUTPUT SPECTRUM
WITH DELAY AND DOPPLER SHIFT
(AMPLITUDE NOT INDICATED)

ACTUAL OUTPUT SPECTRUM
WITH DELAY AND DOPPLER SHIFT
(AMPLITUDE NOT INDICATED)

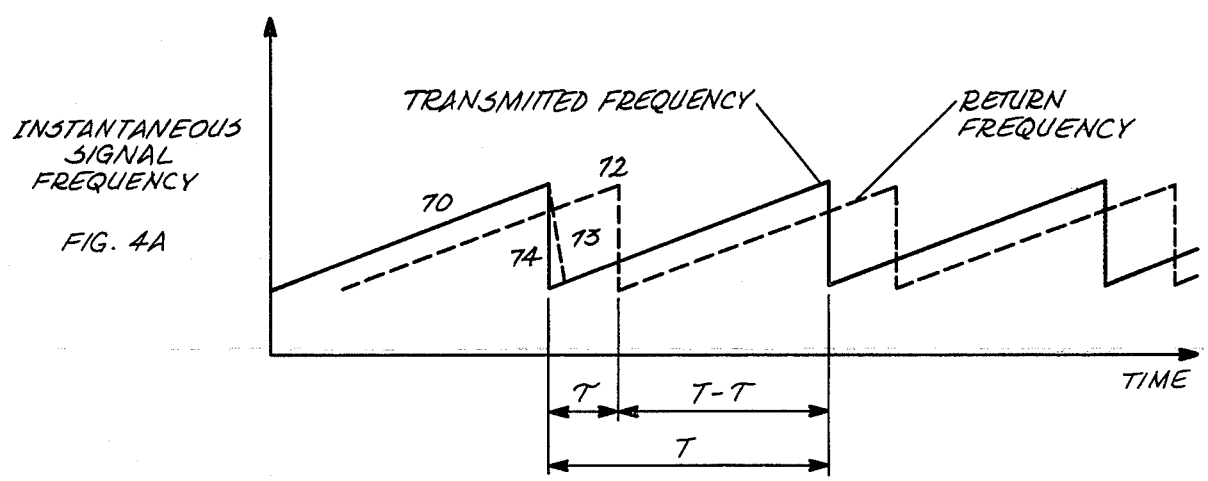
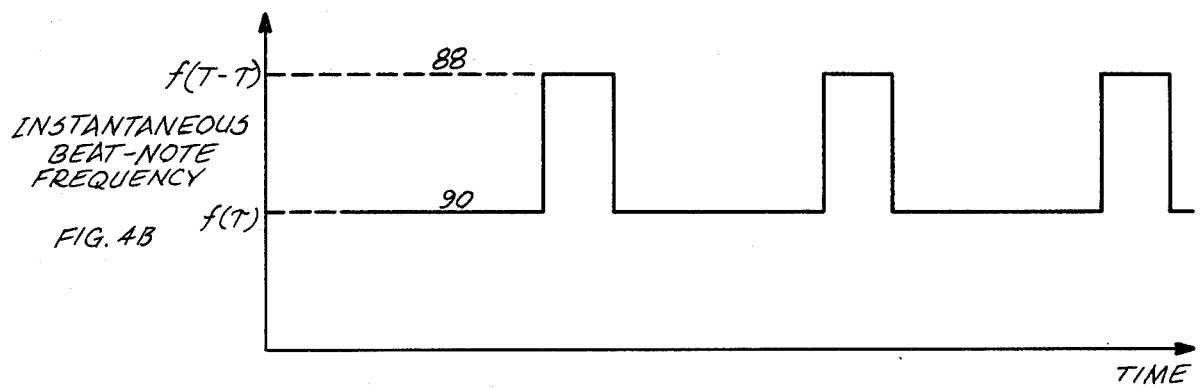
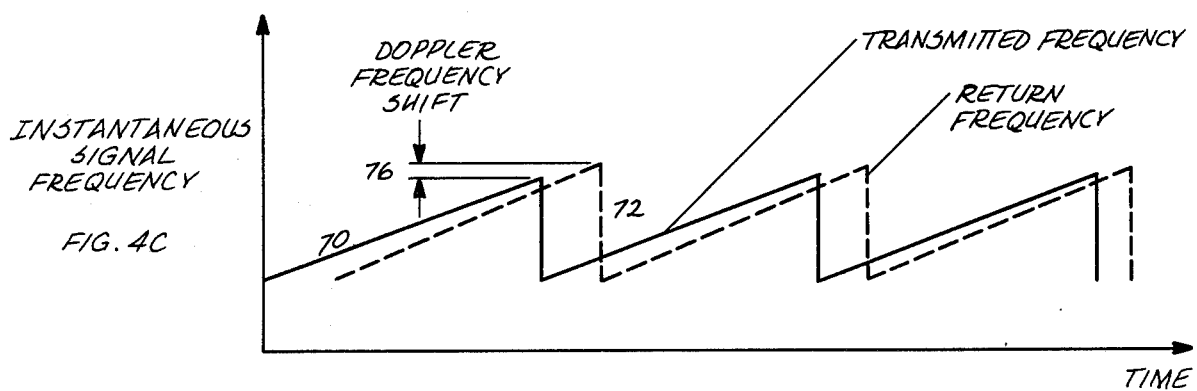
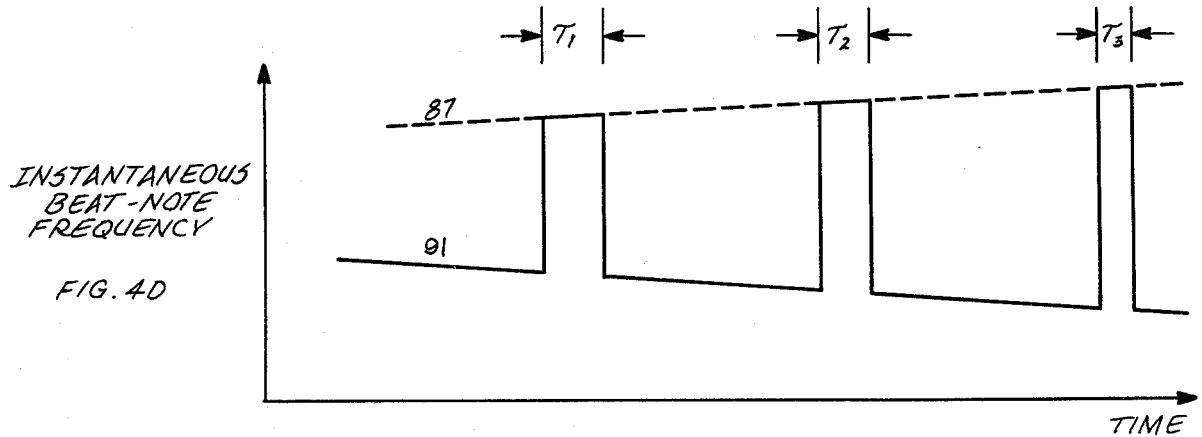

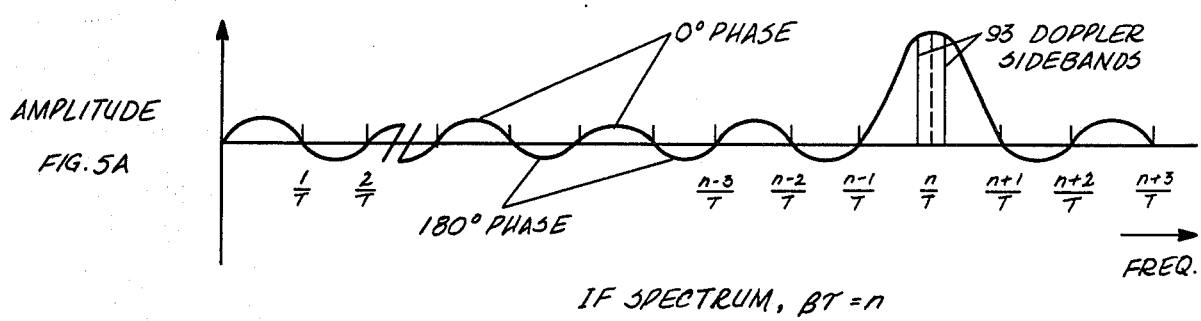
IF SPECTRUM, $\beta T = n$
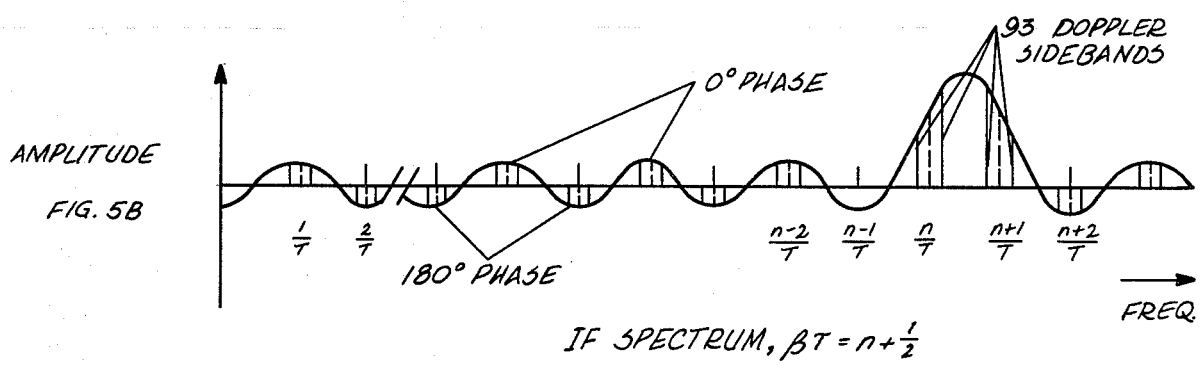
IF SPECTRUM, $\beta T = n + \frac{1}{2}$
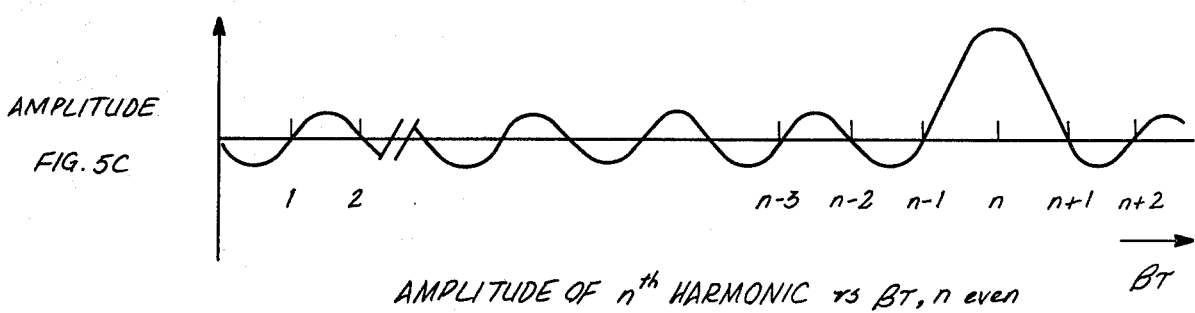
AMPLITUDE OF $n^{th}$ HARMONIC vs $\beta T$, n even
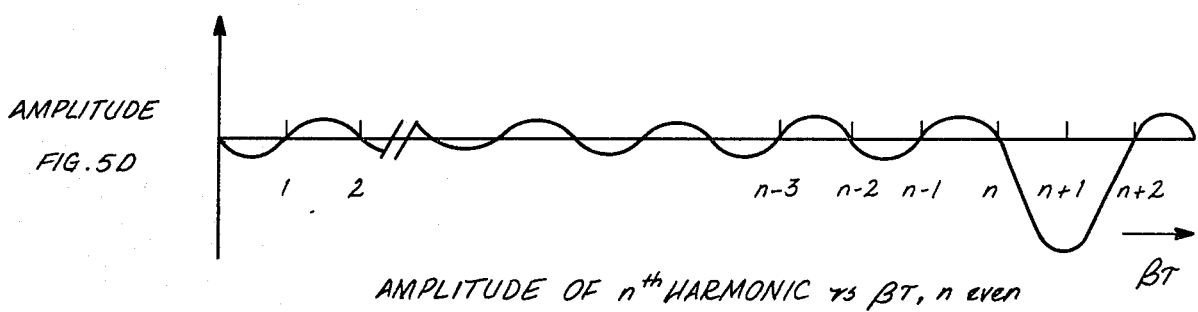
AMPLITUDE OF $n^{th}$ HARMONIC vs $\beta T$, n even
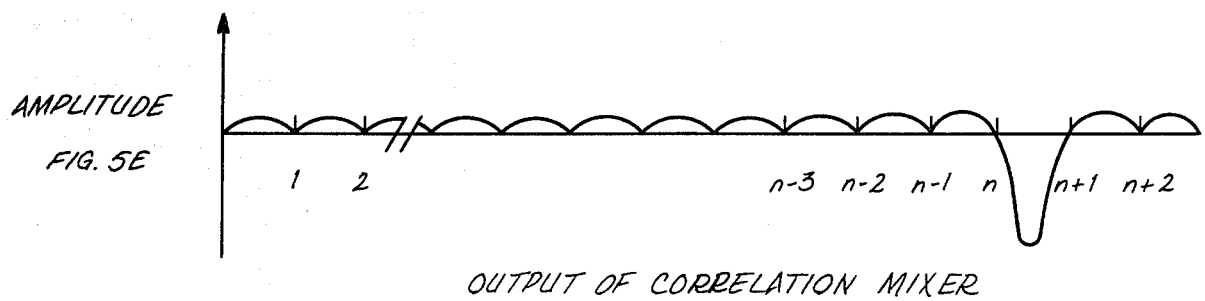
OUTPUT OF CORRELATION MIXER

DUAL CHANNEL CORRELATOR FOR AN FM-CW RANGING RADAR

RIGHTS OF THE GOVERNMENT

The invention described herein may be manufactured, used or licensed by or for the government of the United States of America for governmental purposes without payment to us of any royalties therefor.

BACKGROUND OF THE INVENTION

This invention relates generally to frequency modulated-continuous wave (FM-CW) ranging radars and more particularly to an FM-CW ranging radar that eliminates the sidelobe ambiguity in the range response signal.

The type of radar that employs continuous transmission, either modulated or unmodulated, has had wide application. Two of the earliest applications were the proximity fuze and the FM-CW altimeter. The FM-CW radar has wide application today in fuzes that are designed to detonate at a preset distance from a predetermined target. This application requires that the radar system be simple and cost-effective, be accurate, i.e., provide a signal at the pre-set distance, and be able to function in the presence of extraneous signals caused by passive countermeasures such as corner reflectors or extraneous signals caused by active countermeasures such as ECM.

The signal generated by an FM-CW ranging radar system is known as the range response. The range response of a single channel FM-CW radar is approximately a (sin x)/x shape which consists of a mainlobe and sidelobes. The presence of sidelobes in the range response of an FM-CW radar limits the dynamic range of target amplitude which the radar can handle unambiguously. Therefore, since the first sidelobes in the range response generated by a single channel FM-CW ranging radar are only approximately 13 dB below the main lobe, the unambiguous dynamic range of the system is only approximately 13 dB. To improve the unambiguous range of the system it is necessary to either reduce or eliminate the sidelobes in the range response. The prior art, described by (1) Peperone, S. J., "Side-Lobe Suppression in an FM Altimeter," Master's Thesis, University of Md., College Park, Md., May, 1966, (2) Tozzi, L. M., "Resolution in Frequency-Modulated Radars," Ph.D. Dissertation, University of Md., College Park, Md., 1972, and (3) Mattox, B. G., "Improvement of the Range Response of Short-Range FM Radars," Ph.D. Dissertation, University of Florida, 1975, uses two general approaches to reduce the amplitude of the sidelobes. One approach is to shape the transmitted waveform and the second approach is to shape the received waveform. Practically, the unambiguous dynamic range can be increased to approximately 30 dB. Unfortunately, ECM methods can overcome this ambiguity range by generating an appropriate signal of sufficient power which results in the malfunctioning or pre-detonation of the fuze, thus either negating or reducing the effectiveness of the device.

It is therefore one object of this invention to provide an FM-CW ranging radar wherein the sidelobe ambiguity is eliminated.

It is another object of this invention to provide an FM-CW ranging radar wherein the necessity of counter ECM devices is eliminated.

It is a further object of this invention to provide an FM-CW ranging radar wherein the sidelobe ambiguity is eliminated simply and cost effectively.

It is still another object of this invention to provide a method wherein the sidelobe ambiguity in FM-CW ranging radars can be eliminated.

It is still a further object of this invention to provide a method wherein the effectiveness of devices using FM-CW radar ranging systems can be improved.

Other objects, advantages and novel features of the present invention will become apparent from the following detailed description of the invention when considered in conjunction with the accompanying drawings.

SUMMARY OF THE INVENTION

These and other objects, features and advantages of the invention are accomplished by an FM-CW ranging radar wherein an FM-CW signal with a periodic modulation frequency is transmitted and reflected from a target. The reflected signal is combined with a sample of the transmitted signal to provide a difference signal. A selected portion of the difference signal is amplified and combined with selected harmonics of the periodic modulation frequency to provide further difference signals. These difference signals are in turn combined to provide a further difference signal that has a mainlobe of one polarity and sidelobes of an opposite polarity.

BRIEF DESCRIPTION OF THE DRAWINGS

The above and further objects and novel features of the invention will more fully appear from the following description when the same is read in connection with the accompanying drawings. It is to be understood, however, that the drawings are for the purpose of illustration only, and are not intended as a definition of the limits of the invention.

FIGS. 3A–3H are graphical representations of waveforms and spectrums at various locations within the FM-CW ranging radar.

FIGS. 4A–4D are graphical representations of the waveforms at the input and output of the first mixer resulting when a sawtooth modulation is employed in the present invention.

FIGS. 5A & 5B are graphical representations of the IF spectrum shown at the output of the harmonic amplifier.

FIG. 5C is a graphical representation of the amplitude of the $n^{th}$ harmonic at the output of a single channel FM-CW ranging radar.

FIG. 5D is a graphical representation of the amplitude of the $n^{th}+1$ harmonic at the output of a second channel in an FM-CW ranging radar as shown in the present invention.

FIG. 5E is a graphical representation of the amplitude of the signal resulting from mixing the outputs of the dual channels.

DESCRIPTION OF THE PREFERRED EMBODIMENT

Figure 1:
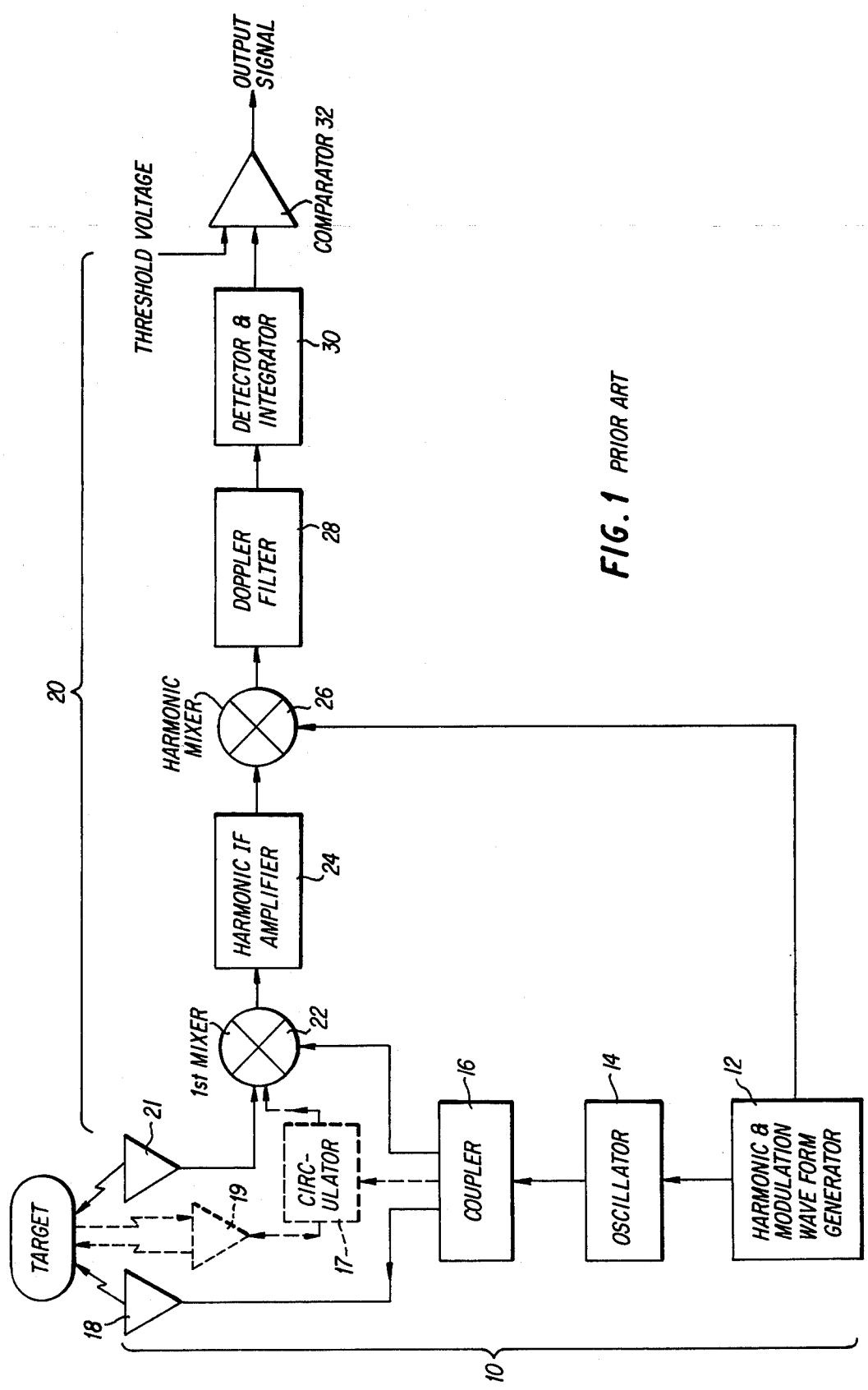
FIG. 1 is a block diagram of a single channel FM-CW ranging radar as shown in the prior art.

Referring now to the drawings, FIG. 1 is a block diagram of a prior art single channel harmonic mixer FM-CW radar system. The transmitting portion of the system, shown generally at 10, comprises a harmonic and modulation waveform generator 12, an oscillator 14, a coupler 16 and a transmitting antenna 18. Shown in phantom outline is an alternate embodiment comprising a circulator 17 and an antenna 19 which is utilized to both transmit and receive signals.

The receiving and signal processing portion of the system shown generally at 20 comprises a receiving antenna 21, a first mixer 22, a harmonic IF amplifier 24, a harmonic mixer 26, a low pass or doppler filter 28, a detector and integrator 30 and a comparator 32. The operation of the prior art system will be included in the discussion of the operation of the present invention.

Figure 2:
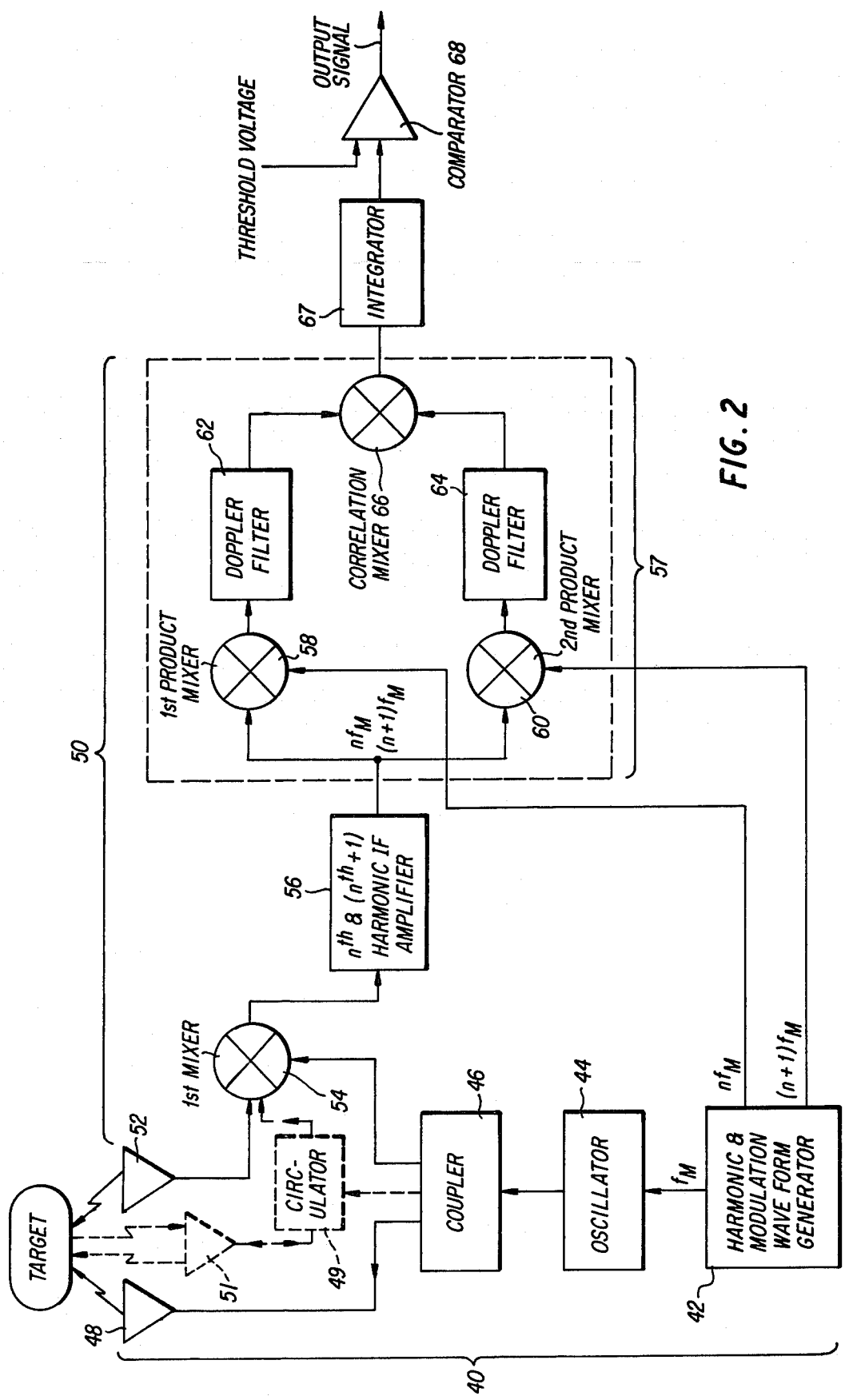
FIG. 2 is a block diagram of a dual channel FM-CW ranging radar as taught in the present invention.

Referring now to FIG. 2 which is a block diagram of the present invention, the transmitting portion of the system shown generally at 40 is basically the same as that shown in the prior art and comprises a harmonic and modulation waveform generator 42, an oscillator 44, a coupler 46 and a transmitting antenna 48. Also, shown in phantom is an alternative embodiment comprising a circulator 49 and an antenna 51 which is utilized to both transmit and receive signals.

The receiving and signal processing portion of the system shown generally at 50 comprises a receiving antenna 52, a first mixer 54, a harmonic IF amplifier 56, a dual channel correlator, shown generally at 57, an integrator 67 and a comparator 68. The dual channel correlator 57 comprises a first channel with a product mixer 58, a doppler filter 62 with an output to correlation mixer 66, and a second channel with a product mixer 60, a doppler filter 64 with an output to correlation mixer 66.

Figure 3A:
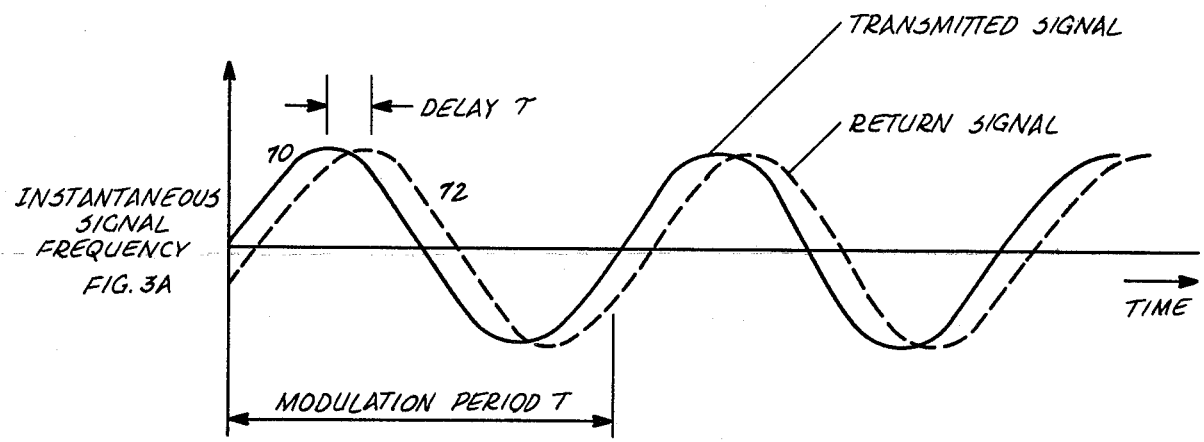
Figure 3B:
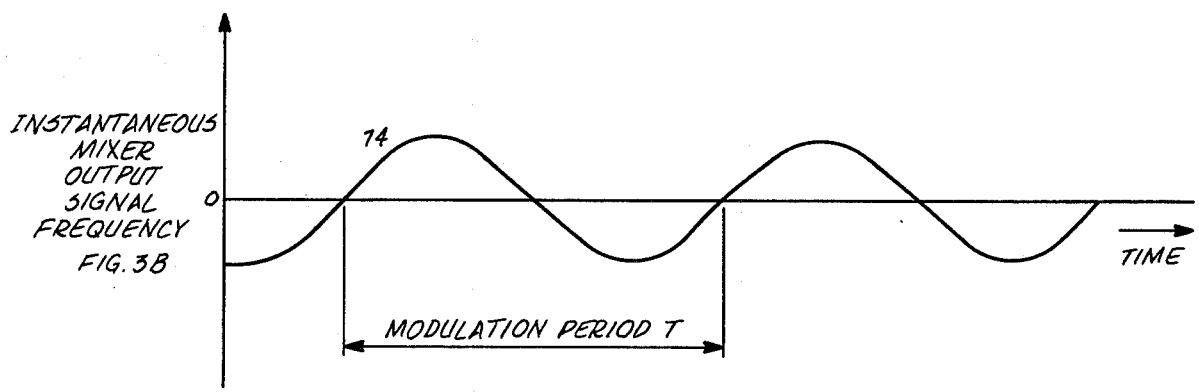
Figure 3C:
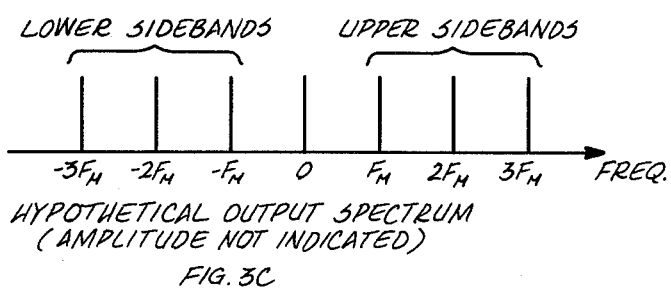
Figure 3D:
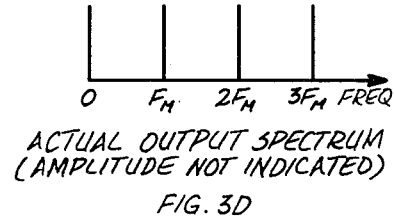

The operation of the present invention will be explained in conjunction with FIGS. 1-5. Oscillator 44 FIG. 2 is frequency modulated by the harmonic and modulation waveform generator 42 to provide a periodic frequency modulated-continuous wave signal which is coupled by coupler 46 to a transmitting antenna 48. The coupler 46 also provides a sample of the transmitted signal to be used as a reference signal to the first mixer 54. A portion of the transmitted signal is reflected from a target and is received by antenna 52 which has an output to the first mixer 54. The reflected signal is received at the first mixer 54 where it is mixed with the sample of the transmitted signal from coupler 46. As can be appreciated, the signals at the first mixer 54 differ by a time $\tau$ which is the time it takes for the signal to travel from the transmitting antenna to the target and back to the receiving antenna. The signal analysis can be seen by referring to FIGS. 3A-3H. FIG. 3A illustrates a sinusoidal frequency modulated-continuous wave transmitted signal 70 and a reflected signal 72. The modulation period is $T=1/F_m$ where $F_m$ is the frequency of the modulation waveform and the time difference between the transmitted signal and the received signal is represented by $\tau$, FIGS. 3A-3D illustrate the signal relationship when there is no relative motion between the radar and the target. FIG. 3B is the instantaneous mixer output signal 74 and is the difference between the transmitted and received signal. FIGS. 3C & 3D illustrate the hypothetical and actual mixer output spectrum. The hypothetical mixer output spectrum is centered around zero frequency and consists of frequencies which are the harmonics of the modulation frequency $F_m$. The actual mixer output spectrum shows the frequencies folded around the real axis.

Figure 3G:
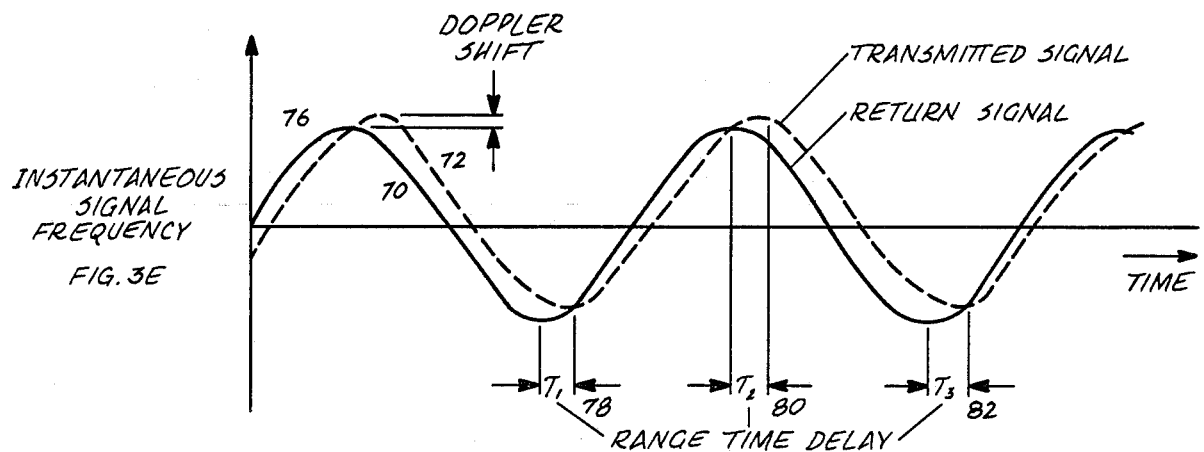
Figure 3G:
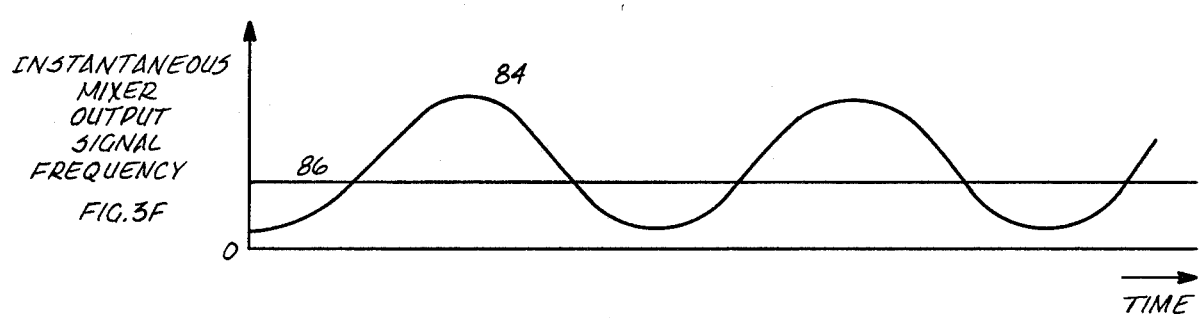
Figure 3G:
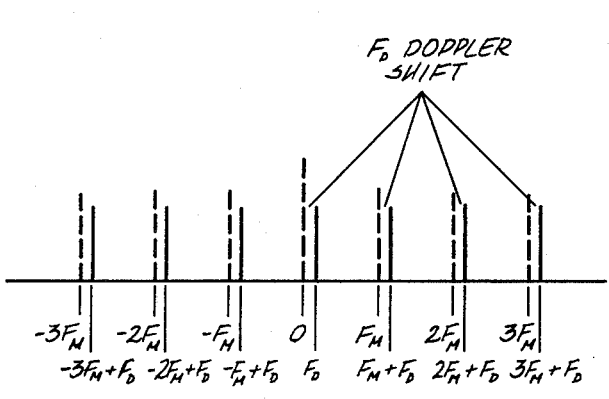
Figure 3H:
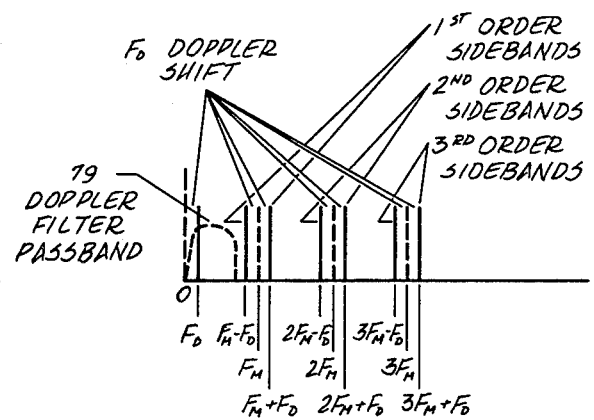

FIGS. 3E-3H illustrate the signal relationships when there is relative motion between the target and the radar which introduces a doppler shift into the signal relationship. FIG. 3E illustrates the relationship represented by the illustration shown in FIGS. 3A-3D plus the effects of relative motion. The transmitted signal is represented by 70 and the return signal by 72. The return signal will be higher in frequency due to doppler when the distance between the radar and target is decreasing and will be lower when the distance between the radar and target is increasing. The effects of doppler and the frequency effects are well known in the art. The results upon the signal relationship is represented in FIG. 3E by the distance 76. The return signal will be displaced upward from the transmitted signal, i.e. a higher frequency for decreasing distance, and will be displaced downward from the transmitted signal, i.e., a lower frequency for an increasing distance. As can also be appreciated the time $\tau$ it takes the reflected signal to return will change as the distance changes. For a decreasing distance, i.e., the radar moving towards the target, the time $\tau$ will decrease. This is indicated in FIG. 3E by distances 78, 80 and 82 which indicate a $\tau_1$, $\tau_2$, and $\tau_3$ where $\tau_1 \neq \tau_2 \neq \tau_3$. The relative movement and resultant doppler shift in the signal relationship and its effects upon the instantaneous mixer output signal is illustrated graphically in FIG. 3F. The instantaneous mixer output signal is a difference signal 84 which varies about a center frequency other than zero, which was the case for no relative motion. The center frequency is equal to the doppler shift and is represented by line 86 in FIG. 3F. FIGS. 3G and 3H are the hypothetical and actual mixer output spectrum. The hypothetical mixer output spectrum is similar to the hypothetical mixer output spectrum for the no relative motion situation as illustrated in FIGS. 3A-3D. However, the spectrum for the relative motion situation is shifted along the frequency axis by a distance equal to the doppler shift $F_D$. The distance between the harmonics is still approximately equal to $F_m$ but the absolute values are equal to $F_D$, $F_m+F_D$, $2Fm+FD$, etc. FIG. 3H illustrates the actual output spectrum with the negative frequencies shown in FIG. 3G folded about the zero frequency axis. In the actual spectrum there is a center frequency at $F_D$, two frequencies centered around $F_m$ at a distance $\pm F_D$ from $F_m$, two frequencies centered around $2F_m$ at a distance $\pm F_D$ from $2F_m$, etc.

FIGS. 4A-4D illustrate graphically a further example of a periodic modulation waveform that can be used, in this case a sawtooth modulation waveform. Any type of periodic modulation waveform is appropriate, sinusoidal (as shown in FIGS. 3A-3H), triangular, sawtooth, etc. FIGS. 4A and 4B illustrate the transmitted and reflected signal relationship when there is no relative motion between the radar and the target. As in the examples discussed above, the transmitted signal 70 and the return or reflected signal 72 differ in time by $\tau$. The modulation period is equal to $T=1/F_m$ where $F_m$ is the frequency of the modulation waveform. FIG. 4B illustrates graphically the instantaneous beat-note frequency which is also the instantaneous mixer output. The mixer output is represented in this ideal case by two frequencies, one which is a function of $\tau$, represented by line 90 and one which is a function of $T-\tau$, represented by line 88. This is the ideal situation because as known in the art, it is impossible to achieve an instantaneous change in frequency, which is represented by line 71, FIG. 4A, being vertical. The actual situation is represented by line 73 which shows that it takes a finite time to change frequencies. However, the slope of line 73 depends upon the quality of the equipment and since each case cannot be discussed only the ideal situation will be discussed, which as those of normal skill in the art will appreciate is sufficient for a complete description of the operation of the system. FIGS. 4C and 4D illustrate graphically the effects upon the signal relationship when there is relative motion between the radar and the target. FIG. 4C shows the transmitted signal 70, the return signal 72, the effect of the doppler shift 76 and the change in the time $\tau$. The changing time is represented by $\tau_1$, $\tau_2$, and $\tau_3$ where each succeeding $\tau$ is less than the previous $\tau$. The effects of relative motion and the resultant doppler shift is illustrated in FIG. 4D. The two frequencies, discussed above in conjunction with FIG. 4B, are no longer constant. This is represented by lines 87 and 91 which have a slope indicating that the two frequencies at the mixer output change with time. It is noted that the slopes, i.e., the amount of change, has been exaggerated for purpose of illustration. The effects of these changing frequencies will be addressed below.

Further analysis of the signals will be in conjunction with FIGS. 2, 5A–5E. The oscillator 44 is linearly modulated by the harmonic and modulation waveform generator with a sawtooth modulation waveform as shown in FIGS. 4A–4E with a modulation period of $T=1/F_m$ where $F_m$ is the modulation frequency. As noted above, any type of periodic modulation waveform can be used. The calculations and discussions that follow are predicated on the use of a sawtooth modulation waveform for illustrative purposes only and is not to be interpreted as a limitation upon the scope of the present invention. As discussed above, a sample of the transmitted signal is used as the local oscillator for the first mixer 54. Because the received signal is a delayed replica of the transmitted signal, the difference frequency at the output of the first mixer 54 is a function of the round trip delay time $\tau$ of the received signal, the RF carrier deviation (RF bandwidth $=\beta$) and the modulation period T. For sawtooth modulation the difference frequency spectrum E (f, $\tau$) at the first mixer output, resulting from a point target is as follows:

$$E(f,\tau) = A(\tau)\left[\frac{\sin \pi (\beta\tau - fT)}{\pi(\beta\tau - fT)} + \frac{\sin \pi (\beta\tau + fT)}{\pi(\beta\tau + fT)}\right] \times \sum_{n=-\infty}^{\infty} \delta\left(f = \frac{n}{T}\right)$$

Equation 1 where
A($\tau$)=amplitude as a function of $\tau$
$\delta$=delta function
n=integral harmonic number This spectrum is plotted in FIGS. 5A and 5B for $\beta\tau=n$ and $n+\frac{1}{2}$. The negative lobes indicate a phase change of $\pi$ radians with respect to the positive lobes. For the situation wherein it is desired that the radar generate a signal when a given range is reached, e.g., when a weapon is to be detonated, the radar system is designed with the appropriate parameters. The design parameters that are variable are given by Equation 1 as $\beta$, $\tau$, f, n and T. By choosing the correct value of these parameters the system can be designed to generate a signal at the desired distance from the target. Another parameter that must be considered is the reflectivity of the target which will be discussed in conjunction with the discussion of the comparator 68. First of all the parameters T and $\tau$ are chosen so that $\tau<<T$. This is done because as can be appreciated from the discussion in conjunction with FIGS. 4A–4D there are two beat-notes at the output of the first mixer 54. Each of these beat-notes will have a Fourier transform with a maxima on the positive axis with successive lines spaced at intervals about the maxima, one set of lines spaced as a function of T and the other set of lines spaced as a function of $T-\tau$. When $\tau$ is small compared with T the two maxima are spaced far enough apart so that the contributions from each can be considered independently. The terms $\beta$, $\tau$ and n are chosen so that the system generates a maximum at a value of time delay $\tau$ corresponding to the desired distance. This can be seen more clearly by plotting the amplitude and phase $E_n(\tau)$ of a single harmonic $nF_m$ as a function of $\tau$. This is done by substituting $nF_m$ for f in Equation 1:

$$E_n(\tau) \approx \left[\frac{\sin \pi (\beta\tau - n)}{\pi (\beta\tau - n)} + \frac{\sin \pi (\beta\tau + n)}{\pi (\beta\tau + n)}\right] \times \delta\left(f - \frac{n}{T}\right)$$

(note: the amplitude constants of proportionality will be omitted.) By expanding the sine terms:

$$E_n(\tau) \approx \left[\frac{\sin \pi\beta\tau \cos \pi n - \cos \pi\beta\tau \sin \pi n}{\pi (\beta\tau - n)} + \frac{\sin \pi\beta\tau \cos \pi n + \cos \pi\beta\tau \sin \pi n}{\pi (\beta\tau + n)}\right] \times \delta\left(f - \frac{n}{T}\right)$$

This reduces to:

$$E_n(\tau) \approx \frac{(-1)^n \beta\tau \sin \pi\beta\tau}{\pi [(\beta\tau)^2 - n^2]} \times \delta\left(f - \frac{n}{T}\right)$$

When this is mixed in the first mixer 54 with the sample of the transmitted signal the mixer output is then:

$$E_n(\tau) \approx \frac{(-1)^n \beta\tau \sin \pi\beta\tau}{\pi [(\beta\tau)^2 - n^2]}$$

Equation 2

Equation 2 is a DC voltage whose sense and amplitude changes with target range. Equation 2 and its plot, shown in FIG. 5C is the range response of a single channel harmonic FM-CW radar which is approximately a (sin x)/x shape. Therefore, the peaks of the first sidelobes are approximately 13 dB below the mainlobe and represents the unambiguous dynamic range of the system. Up to this point in the signal analysis the processing of the signal is the same in both the prior art system shown in FIG. 1 and the present invention system shown in FIG. 2. In the prior art system, FIG. 1, the portion of the first mixer 22 output spectrum which includes the harmonic $nF_m$ is amplified by the harmonic IF amplifier 24. This amplified signal is then mixed in the mixer 26 with a reference signal supplied by the harmonic and modulation waveform generator 12. The reference signal comprises the selected harmonic $nF_m$ (the selection criteria of the parameter n is discussed above). The output of mixer 26 consists of a spectrum of frequencies similar to the actual spectrum shown in FIG. 3H and consists of a difference spectrum centered at zero frequency with spectrum lines at $\pm F_D$ from locations corresponding to $nF_m$. With $\tau < < T$ doppler signals can be considered as a perturbation of the harmonic line spectrum to produce AM sidebands. This spectrum is then filtered by the doppler filter 28 to eliminate the higher order harmonics. The passband of the doppler filter 28 is shown by dotted line 79 in FIG. 3H. FIG. 5C is a plot of the doppler envelope of the output of the doppler filter 28, the actual output is shifted slightly by the doppler effect as explained above. The doppler sidebands are shown at 93 in FIGS. 5A and 5B. The detector and integrator 30 detects and integrates the energy under the lobes as the range changes and converts this energy into a measuring parameter such as voltage. This integrator voltage is input into comparator 32 where it is compared to a preset threshold voltage. When the integrator voltage reaches the preset voltage the comparator 32 provides a signal to indicate, for example, that the preset or desired range has been reached. The preset threshold voltage is selected by estimating the reflectivity of the target, i.e., which determines how much of the transmitted signal energy will be returned or reflected. It can be appreciated how a predetonation can occur in the system illustrated in FIG. 1 if (1) the estimation of the target reflectivity is too low, i.e., more energy is received, detected and integrated, therefore causing the comparator input voltage to reach the preset voltage too quickly, (2) if, for example, a corner reflector is employed or there are buildings which would act as corner reflectors which would return more energy than expected or (3) ECM are used to pump energy into the system. All of these effects would increase the relative size of the range response, including the sidelobes which would cause the comparator 32 to change state and provide an erroneous signal. As discussed in the background of the invention, the prior art devices attempted to decrease this problem by decreasing the size, i.e., the energy content of the sidelobes, thus decreasing the probability of prefunctioning, However, as can be appreciated the use of high powered ECM could still pump enough energy into the system to predetonate a weapon.

To eliminate the range ambiguity the present invention as shown in FIG. 2 was developed. As explained above, the functions of the components 42–54 are the same as the components 12–22 shown in the prior art, FIG. 1. In the present invention, the harmonic IF amplifier amplifies that portion of the first output mixer 54 spectrum that includes the selected harmonic $nF_m$ and the next adjacent harmonic $(n+1)F_m$, i.e., the harmonic IF amplifier is centered at $(2n+1)/2F_m$. The output of the first product mixer 58 is similar to the output of the mixer 26 of the single channel system. That is, Equation 2, repeated here $$E_n(\tau) \approx \frac{(-1)^n \beta\tau \sin \pi\beta\tau}{\pi [(\beta\tau)^2 - n^2]} \quad \text{Equation 3}$$

describes the output of mixer 58 and is plotted in FIG. 5C.

The output of mixer 60 is similar and is:

$$E_{n+1}(\tau) \approx \frac{(-1)^{n+1}\beta\tau \sin \pi\beta\tau}{\pi [(\beta\tau)^2 - (n+1)^2]} \quad \text{Equation 4}$$

which is plotted in FIG. 5D.

As discussed above, the doppler signal is considered as a perturbation about the spectral lines which are transmitted through the doppler filters, 62, 64. Equations 3 and 4 represent the doppler envelopes, i.e., the terms representing the spectral lines and are used for the signal analysis. As can be seen from FIGS. 5C and 5D the mainlobes of the two selected adjacent harmonics are of opposite polarity. These signals are then input to the correlation mixer 66 to give as an output:

Equation 5
$$E_n(\tau) \times E_{n+1}(\tau) \approx \frac{(-1)^n(-1)^{n+1}(\beta\tau)^2 \sin^2 \pi\beta\tau}{\pi^2[(\beta\tau)^2 - n^2][(\beta\tau)^2 - (n+1)^2]} \quad \text{OR}$$

$$E_n(\tau) \times E_{n+1}(\tau) \approx \frac{-(\beta\tau)^2 \sin^2 \pi\beta\tau}{\pi^2[(\beta\tau)^2 - n^2][(\beta\tau)^2 - (n+1)^2]}$$

Equation 5 is the range response of the present invention system and is plotted in FIG. 5E. The mainlobe of the range response is of one polarity while all of the sidelobes are of an opposite polarity. The output of the correlation mixer 66 is input to integrator 67 which integrates only the energy under the lobe which has the correct polarity. This integrated energy is converted to a representative voltage and is input to comparator 68. When this representative voltage reaches a preset threshold level comparator 68 changes state and provides a signal which can be used, for example, to detonate a weapon or to indicate a particular distance from a target such as the earth's surface. Thus, it can be appreciated that by causing the system to respond only to that energy in the predetermined mainlobe, ECM or false targets which input energy into the system will only increase the size, i.e., the energy content of the sidelobes. Because the sidelobes are of one polarity and the system only responds to the energy in the mainlobe, the system is unaffected by ECM or false targets.

While the invention has been described with reference to the accompanying drawings, it is to be clearly understood that the invention is not to be limited to the particular details shown therein as obvious modifications may be made by those skilled in the art. The embodiment of the invention should only be construed within the scope of the following claims.

What we claim is:

1. A method of eliminating the sidelobe ambiguity in the range response of an FM-CW radar comprising the steps of:
transmitting a periodic FM-CW signal with a selected periodic frequency;
receiving a reflected signal which comprises a reflected portion of the transmitted signal;
combining the reflected signal with a first reference signal to obtain a first combination signal;
amplifyng a selected portion of the first combination signal;
combining the amplified selected portion of the first combination signal with second and third reference signals to obtain second and third combination signals; and
combining the second combination signal with the third combination signal to obtain a fourth combination signal with a main lobe of one polarity and sidelobes of an opposite polarity.

2. A method of eliminating the sidelobe ambiguity in the range response of an FM-CW radar as recited in claim 1, wherein the first reference signal is obtained by sampling the transmitted signal.

3. A method of eliminating the sidelobe ambiguity in the range response of an FM-CW radar as recited in claim 2, wherein the step of combining the reflected signal with a first reference signal is accomplished by mixing the reflected signal with the sample of the transmitted signal to obtain a first difference signal.

4. A method of eliminating the sidelobe ambiguity in the range response of an FM-CW radar as recited in claim 3, wherein the step of amplifying a selected portion of the first combination signal is accomplished by amplifying a portion of the first difference signal that includes a selected harmonic and next adjacent harmonic of the selected periodic frequency.

5. A method of eliminating the sidelobe ambiguity in the range response of an FM-CW radar as recited in claim 4, wherein the second and third reference signals are obtained by producing the selected harmonic and next adjacent harmonic of the selected periodic frequency.

6. A method of eliminating the sidelobe ambiguity in the range response of an FM-CW radar as recited in claim 5, wherein the step of combining the amplified selected portion of the first combination signal with second and third reference signals is accomplished by:
mixing a first portion of the amplified first difference signal with the selected harmonic of the periodic frequency to obtain a second difference signal; and
mixing a second portion of the amplified first difference signal with the next adjacent harmonic of the periodic frequency to obtain a third difference signal.

7. A method of eliminating the sidelobe ambiguity in the range response of an FM-CW radar as recited in claim 6, wherein the step of combining the second combination signal with the third combination signal is accomplished by:
filtering second order and above harmonics from the second and third difference signals; and
multiplying the second difference signal with the third difference signal.

8. A method of eliminating the sidelobe ambiguity in the range response of an FM-CW radar as recited in claim 7, further comprising the step of generating a fifth signal when the amplitude of the mainlobe reaches a preset level.

9. An FM-CW radar that eliminates the sidelobe ambiguity in the range response signal comprising:
means for transmitting a periodic FM-CW signal with a selected periodic frequency;
means for receiving a reflected signal which comprises a reflected portion of the transmitted signal;
means for combining the reflected signal with a first reference signal to obtain a first combination signal;
means for amplifying a selected portion of the first combination signal;
means for combining the amplified selected portion of the first combination signal with a second and third reference signal to obtain second and third combination signals; and
means for combining the second combination signal with the third combination signal to obtain a fourth combination signal with a mainlobe of one polarity and sidelobes of an opposite polarity.

10. An FM-CW radar that eliminates the sidelobe ambiguity in the range response signal, as recited in claim 9, further comprising means to sample the transmitted signal for use as the first reference signal.

11. An FM-CW radar that eliminates the sidelobe ambiguity in the range response signal, as recited in claim 10, wherein the means for combining the reflected signal with a first reference signal comprises a mixer wherein the reflected signal is mixed with the sample of the transmitted signal to produce a first difference signal.

12. An FM-CW radar that eliminates the sidelobe ambiguity in the range response signal, as recited in claim 11, wherein the means for amplifying a selected portion of the first difference signal comprises a harmonic IF amplifier with a bandwidth that includes a selected harmonic and next adjacent harmonic of the selected periodic frequency.

13. An FM-CW radar that eliminates the sidelobe ambiguity in the range response signal, as recited in claim 12, further comprising means to generate the selected harmonic and next adjacent harmonic of the selected periodic frequency which are used as the second and third reference signals.

14. An FM-CW radar that eliminates the sidelobe ambiguity in the range response signal, as recited in claim 13, wherein the means for combining the amplified selected portion of the first combination signal with a second and third reference signal comprises:
a first mixer wherein a first portion of the first difference signal is mixed with the selected harmonic of the periodic frequency to produce a second difference signal; and
a second mixer wherein a second portion of the first difference signal is mixed with the next adjacent harmonic of the selected periodic frequency to produce a third difference signal.

15. An FM-CW radar that eliminates the sidelobe ambiguity in the range response signal, as recited in claim 14, wherein the means for combining the second combination signal with the third combination signal comprises:
means for filtering second order and above harmonics from the second and third difference signals; and
means for multiplying the second and third difference signal.

16. An FM-CW radar that eliminates the sidelobe ambiguity in the range response signal, as recited in claim 15, further comprising means for generating a fifth signal when the mainlobe of the fourth combination signal reaches a preset level.

* * * * *